(12) United States Patent
Suess

(10) Patent No.: US 9,216,666 B2
(45) Date of Patent: Dec. 22, 2015

(54) SEAT RAIL FOR A MOTOR VEHICLE SEAT

(71) Applicant: Brose Fahrzeugteile GmbH & Co. Kommanditgesellschaft, Coburg, Coburg (DE)

(72) Inventor: Matthias Suess, Grossheirath (DE)

(73) Assignee: Brose Fahzeugteile GmbH & Co. Kommanditgesellschaft, Coburg, Coburg (DE)

( * ) Notice: Subject to any disclaimer, the term of this patent is extended or adjusted under 35 U.S.C. 154(b) by 205 days.

(21) Appl. No.: 13/890,187

(22) Filed: May 8, 2013

(65) Prior Publication Data

US 2013/0299665 A1 Nov. 14, 2013

(30) Foreign Application Priority Data

May 9, 2012 (DE) .......................... 10 2012 009 235

(51) Int. Cl.
*F16M 13/00* (2006.01)
*B60N 2/07* (2006.01)
*B21D 22/02* (2006.01)
*B21D 53/88* (2006.01)
*B60N 2/68* (2006.01)

(52) U.S. Cl.
CPC .............. *B60N 2/0722* (2013.01); *B21D 22/02* (2013.01); *B21D 53/88* (2013.01); *B60N 2/0732* (2013.01); *B60N 2/688* (2013.01)

(58) Field of Classification Search
CPC ........ B21D 53/88; B21D 22/02; B60N 2/688; B60N 2/0722; B60N 2/0732
USPC ................ 248/429, 200, 300, 430; 297/344.1
See application file for complete search history.

(56) References Cited

U.S. PATENT DOCUMENTS

| | | | | |
|---|---|---|---|---|
| 5,028,028 A * | 7/1991 | Yamada et al. | ............... | 248/430 |
| 5,848,775 A * | 12/1998 | Isomura et al. | ............... | 248/430 |
| 6,152,415 A * | 11/2000 | Seki et al. | ..................... | 248/430 |
| 6,176,460 B1 * | 1/2001 | Kojima et al. | ................ | 248/429 |
| 6,616,233 B1 * | 9/2003 | Debus et al. | ................... | 297/341 |
| 6,869,057 B2 * | 3/2005 | Matsumoto et al. | .......... | 248/430 |
| 7,506,856 B2 * | 3/2009 | Ikegaya et al. | ................ | 248/430 |
| 7,798,462 B2 * | 9/2010 | Yoshida et al. | ............... | 248/429 |
| 8,075,039 B2 * | 12/2011 | Rohee et al. | ................ | 296/65.13 |
| 8,201,798 B2 * | 6/2012 | Nihonmatsu et al. | ......... | 248/430 |
| 2004/0217251 A1 * | 11/2004 | Leguede et al. | ............... | 248/424 |

(Continued)

FOREIGN PATENT DOCUMENTS

| | | |
|---|---|---|
| CN | 101952066 A | 1/2011 |
| DE | 41 13 165 A1 | 10/1991 |

(Continued)

OTHER PUBLICATIONS

CN Office action dated Apr. 3, 2015 for Application No. 201310170377.7 (8 pages), and English translation (8 pages).

(Continued)

*Primary Examiner* — Anita M King
(74) *Attorney, Agent, or Firm* — Christie, Parker & Hale, LLP

(57) ABSTRACT

The invention relates to a seat rail for a motor vehicle seat, consisting of a lower rail and an upper rail shiftably mounted thereon, with at least one attachment part of the upper rail fabricated of sheet metal for fixing a seat or a safety belt. At least one marginal edge of the attachment part is blunted and solidified by an embossment.

6 Claims, 2 Drawing Sheets

(56) References Cited

U.S. PATENT DOCUMENTS

2004/0232303 A1  11/2004  Rausch et al.
2011/0003113 A1   1/2011  Lengauer et al.
2012/0006211 A1   1/2012  Bytow et al.

FOREIGN PATENT DOCUMENTS

| DE | 103 42 101 A1 | 4/2005 |
| DE | 10 2004 020 483 A1 | 11/2005 |
| DE | 10 2010 017 328 A1 | 12/2011 |
| EP | 1 425 198 B1 | 6/2004 |

OTHER PUBLICATIONS

Articles of Law Cited by the Examiner in CN Office action dated Apr. 3, 2015 and Search Report for Application No. 2013101703777 (3 pages).

* cited by examiner

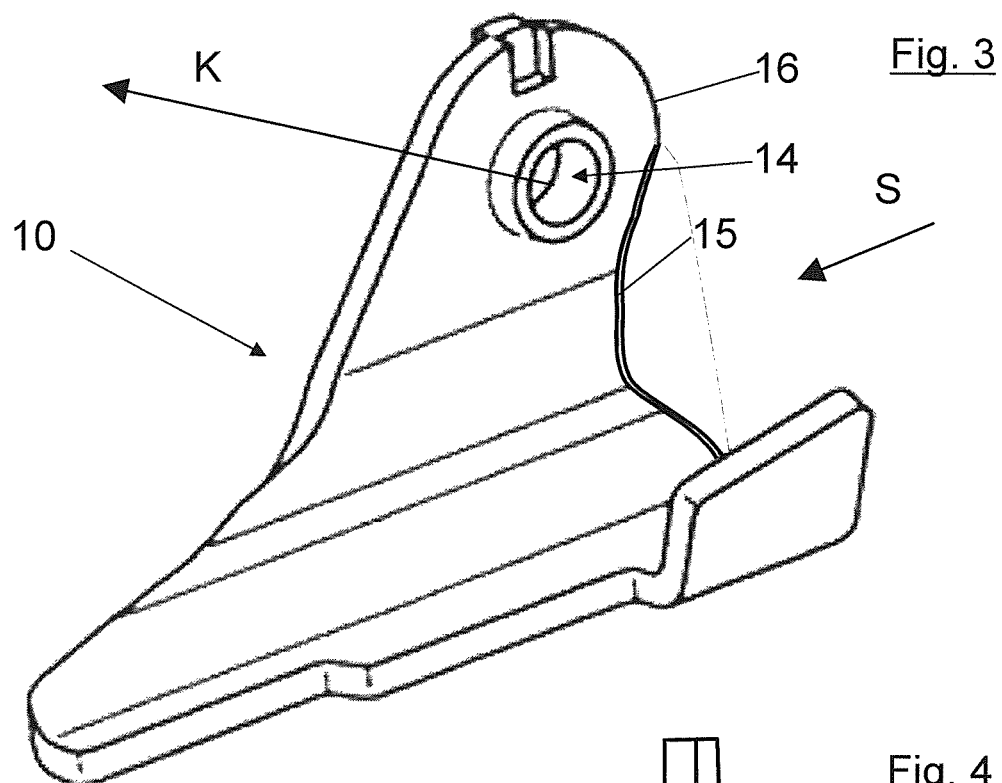
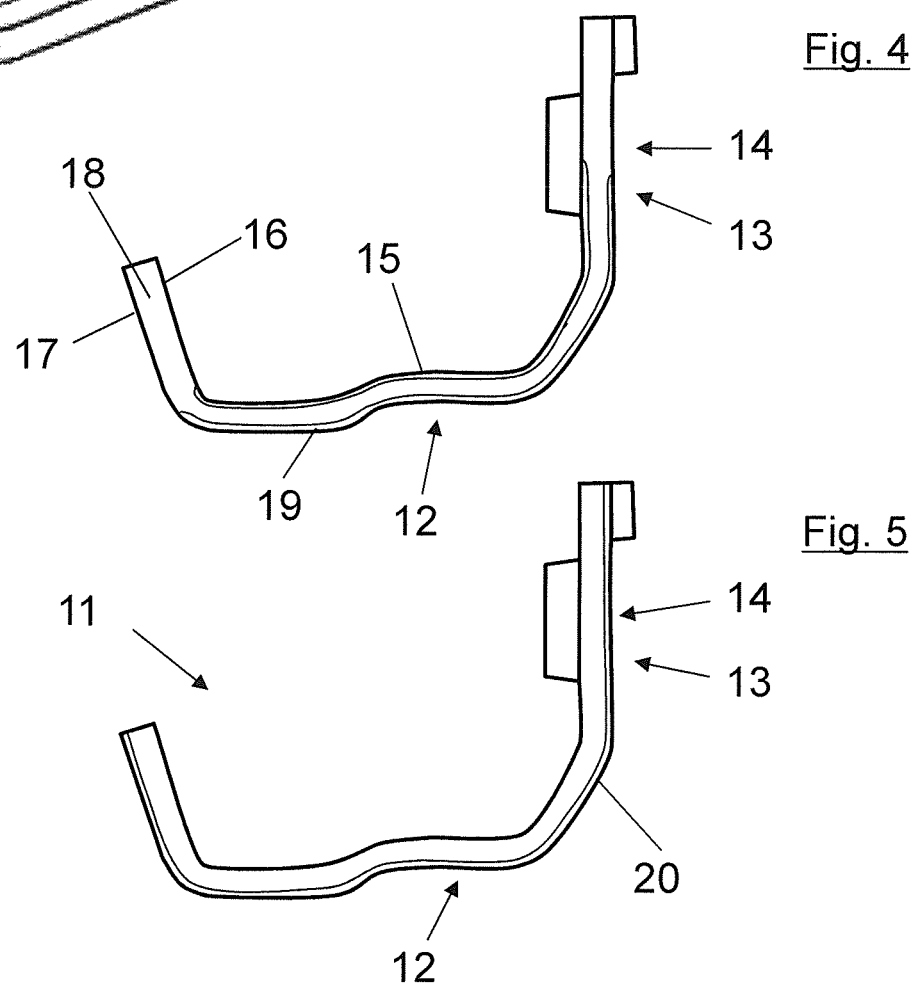

SEAT RAIL FOR A MOTOR VEHICLE SEAT

CROSS-REFERENCE TO RELATED APPLICATION

This application claims the benefit of German Patent Application No. 10 2012 009 235.0 filed on 9 May 2012 and is fully incorporated herein by reference.

BACKGROUND

This invention relates to a seat rail and to a method for manufacturing such seat rail.

Such seat rails with attachment parts are known for example from EP 1425198 B1. In this document it is chiefly described how attachment parts are fixed on the seat rails by welding, or also by screws or rivets, wherein it becomes clear that in particular in accident situations extreme forces can act on the attachment parts. To the attachment parts, a vehicle seat or a safety belt is firmly fixed or articulated, directly or via coupling members, and in the case of an accident it should be ensured that the seat or the safety belt can be displaced relative to the seat rail as little as possible. In any event, an attachment part should not be detached from the seat rail.

SUMMARY

It is the object of the invention to create a seat rail whose attachment parts are designed light-weight and inexpensive, but yet have a high strength and hence a small displacement upon occurrence of forces related to an accident. It is a further object of the invention to disclose an advantageous method for manufacturing said seat rail and attachment parts.

As known, a seat rail consists of upper and lower rail, wherein the lower rail is to be fixed at the floor of a motor vehicle and the upper rail is mounted on the lower rail so as to be shiftable relative to the same. Via attachment parts, a vehicle seat and/or a safety belt are fixed on the upper rail. As usual, the attachment parts are fabricated of sheet metal, preferably of steel sheet. In particular, they are stamped out of a raw material, wherein marginal edges of the attachment part are given afterwards. Two marginal edges each define a marginal surface of a width which approximately corresponds to the thickness of the raw material. However, stamped marginal surfaces each include two marginal edges which are not identical. Depending on the stamping direction, a marginal edge is to be referred to as infeed side (where the stamping tool impinges first) and a marginal edge is the so-called burr side (where the stamping tool exits from the raw material). On closer inspection, the burr side can be shaped relatively irregularly and the material in the region of the burr side of a blank obtained by stamping can have microcracks. Under a high, in particular tensile load, this will reduce the loadability of the attachment part fabricated in this way. To ensure a required crash resistance, the material correspondingly must be chosen thicker (and hence heavier) than would be the case with a perfect regular marginal edge. This is remedied by the solution according to the invention. After stamping, the marginal edges of the blank, in particular the marginal edge of the burr side, are blunted and solidified by embossing, whereby the strength of the attachment part can be increased without increasing the material thickness. Thus, the invention makes a contribution to a light-weight construction with little effort, without impairing the strength of the attachment part. A seat rail with attachment parts whose marginal edges have embossments as mentioned above hence can be designed of light weight and yet satisfy high demands on the crash resistance.

When an attachment part according to the invention is made from a raw material by stamping, some of its marginal surfaces can coincide with the marginal surfaces of the raw material, so that the same are not formed by stamping. The embossments according to the invention preferably only are provided at the stamped marginal edges and there preferably on the burr side, as before embossing this is the weaker side of the blank. It is advantageous to provide the embossment at an angle of about 45 degrees to the marginal surface, so that it extends about 0.2 mm to 1 mm down into the marginal surface and the side face of the blank of the attachment part adjacent to the marginal surface. However, the embossment also can have an uneven shape, for example the shape of a quarter circle.

Embossments of marginal edges in particular should be provided when marginal surfaces undergo an elongation under a maximum load, i.e. are subjected to tension or are loaded in direction of bending up. Most advantageously, the embossments of the marginal edges should be made when fabricating an attachment part after stamping, but before a possibly necessary bending of the blank—i.e. at the flat blank. During bending, however, the embossed structure possibly is again negatively influenced, so that it may be expedient to emboss the marginal edge of a previously bent attachment part in the region of the bend and hence finally blunt and solidify the same. An attachment part fabricated in this way will exert higher forces against bending up.

It is furthermore advantageous when the rolling direction of the raw material is taken into account during manufacture of the attachment part of the seat rail according to the invention. The rolling direction should not extend parallel to the stamped marginal surfaces and hence to the embossed marginal edges, but at an angle thereto. Preferably, the embossed marginal edges are located at an angle between 45 degrees and 135 degrees to the rolling direction, whereby the loadability of the attachment part can be further increased, or it can be designed lighter in weight.

BRIEF DESCRIPTION OF THE DRAWINGS

Further details of the invention can be taken from the following description of an exemplary embodiment.

FIG. 3: shows an attachment part for a seat rail in a perspective representation.

FIG. 4: shows the attachment part of FIG. 3 as seen from the arrow S in FIG. 3.

FIG. 5: shows an attachment part according to FIGS. 3 and 4 in a modified design.

DETAILED DESCRIPTION

Figure 1:
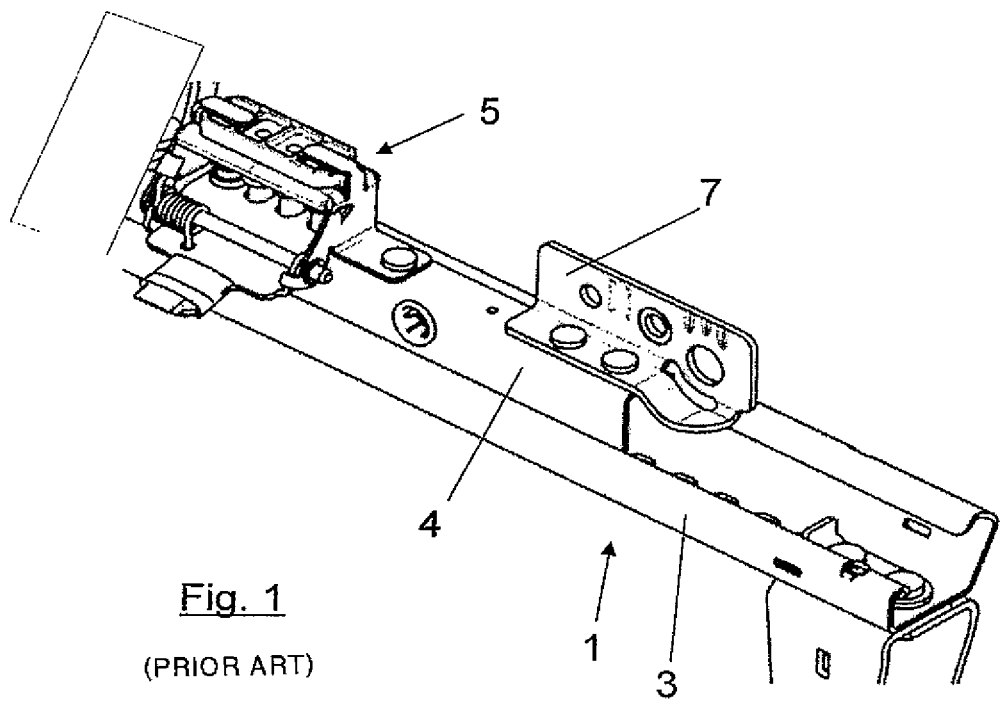
FIG. 1: shows a portion of a seat rail in a perspective representation.
Figure 2:
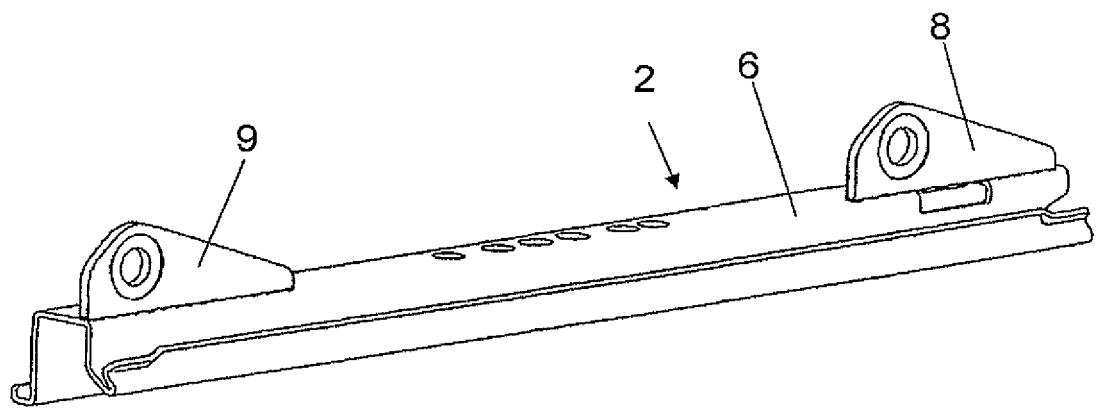
FIG. 2: shows a seat rail of another design.

The seat rails 1, 2 according to FIGS. 1 and 2 correspond to the prior art and these representations only serve to illustrate the field of the invention. A seat rail 1 consists of a lower rail 3 to be fixed on a vehicle floor and an upper rail 4 shiftably mounted therein, on which a vehicle seat is to be fixed. When using two of such seat rails 1, the vehicle seat is to be arranged in the vehicle in a longitudinally shiftable manner, wherein the rails 3, 4 can be locked at each other and hence the seat can be locked in place in the vehicle by a locking device 5.

Of the seat rail 2 only an upper rail 6 is shown and to the upper rails 4 and 6 attachment parts 7-9 are fixed. The attachment parts 7-9 are riveted, screwed or welded to the upper rails and the vehicle seat and/or a safety belt are directly or indirectly attached to the same. In the case of an accident, extremely high forces can be transmitted to the seat rails 1, 2 via the attachment parts 7-9, wherein said seat rails must not fail. Depending on the accident situation, these forces can point in different directions, wherein however the main forces can act in the case of a frontal crash of the vehicle.

In FIGS. 3, 4 and 5 attachment parts 10, 11 of seat rails according to the invention are shown in more detail. They have a surface 12 with which they rest on an upper rail and are fixed there in a known manner. At a portion 13 protruding upwards from there a bearing hole 14 is located, via which a seat frame or a safety belt is to be fixed on the attachment part 10, 11. A large force resulting from an accident thus for example can act on the attachment part 10, 11 in direction of the arrow K. The attachment part 10, 11 tends to be stretched in direction of the arrow K, wherein the radius of the bend between the portions 12 and 13 likewise can increase (bending up). It must constructively be prevented that an attachment part 10, 11 tears, a bearing hole breaks up, or an attachment part 10, 11 is torn off from the upper rail. A measure to achieve this goal is to provide at least one embossment 15 on a marginal edge 16 of the attachment part 10, 11 opposite to the force K. It is also possible to provide both marginal edges 16, 17 of a marginal surface 18 opposite to the force K with embossments 15, 19. Due to these embossments 15, 19 the material in the region of the marginal edges 16, 17 is flattened and compacted, whereby these marginal edges 16, 17 have a higher loadability than would be the case without the embossments 15, 19.

With a total thickness of an attachment part 10, 11 fabricated of steel sheet of 3 mm, for example, the embossments 15, 19 can be mounted to protrude for example 0.5 mm into the marginal surface 18, wherein an angle of the embossment of 45 degrees to the marginal surface is advantageous.

The embossments 15, 19 can be mounted at the flat blank, before the bend of the attachment parts 10, 11 between the portions 12 and 13 is made, which involves little manufacturing effort. However, they can still also be mounted after the bending operation, which is particularly advantageous for the durability of the attachment part 10, 11 in the region of the embossment 19 (in the outer radius of the bend).

If only one embossment 20 is provided in the attachment part 11 like in FIG. 5, the same should be arranged in particular in the region of a burr edge of a blank of an attachment part 11 made by stamping. This burr edge cannot be seen in the Figures, but is loadable less in practice than unmachined edges of a semifinshed product or than infeed edges obtained during stamping. Therefore, an embossment 20 of this burr edge has the highest effect in practice.

A seat rail fabricated according to the invention can be fabricated lighter in weight or of a less expensive material with equal loadability as compared to the prior art, or can be subjected to a higher load as compared to the prior art with the embossments 15, 19, 20 of the attachment parts 10, 11 according to the invention. This is achieved with little effort by the method according to the invention.

The invention claimed is:

1. A seat rail for a motor vehicle seat, the seat rail comprising a lower rail and an upper rail shiftably mounted thereon, the upper rail including at least one attachment part being fabricated of sheet metal for fixing a seat or a safety belt, wherein at least a marginal edge of the attachment part is stamped and is blunted and solidified by an embossment on a burr side of the marginal edge to provide a flattened and compacted material in a region of the marginal edge.

2. The seat rail according to claim 1, wherein the embossment in the region of a marginal edge which under the load of an accident, in particular in a frontal crash, is configured to undergo an elongation.

3. The seat rail according to claim 1, wherein embossments are provided in a region of two adjacent marginal edges of a marginal surface.

4. The seat rail according to claim 1, wherein the embossment is oriented approximately at an angle of 45 degrees to a marginal surface and a side surface of the attachment part, and wherein the embossment has a depth of 0.2 mm to 1 mm.

5. The seat rail according to claim 1, wherein the attachment part is made of a raw material with a rolling direction which extends at an angle of 45 degrees to 135 degrees with respect to the embossment.

6. The seat rail according to claim 1, wherein the embossment increases a strength of the attachment part without increasing a thickness of the attachment part.

* * * * *